Aug. 21, 1934.  J. K. LEIBING  1,971,189
MAGNETIC DETECTOR
Filed Feb. 1, 1933
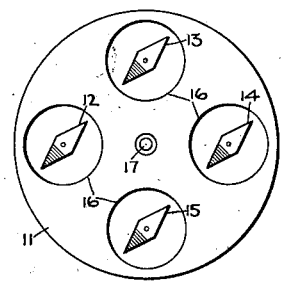
Fig. 1.
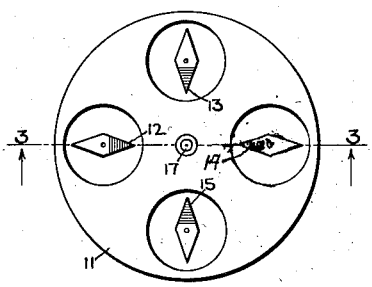
Fig. 2.
Fig. 4.
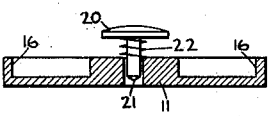
Fig. 3.
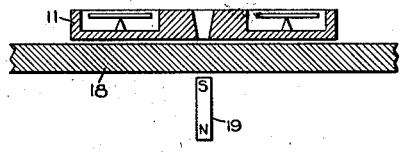
Fig. 8.
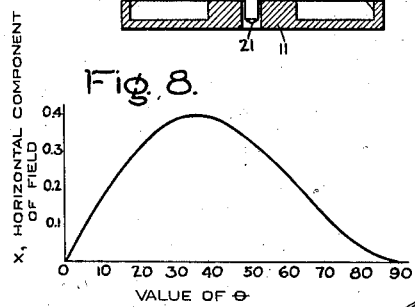
Fig. 5.
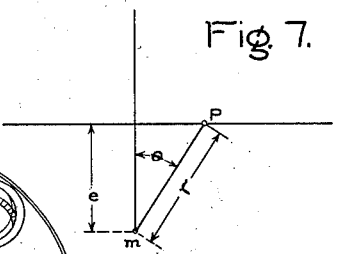
Fig. 7.
Fig. 6.
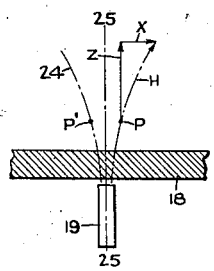
Inventor:
Joseph K. Leibing,
by Charles V. Tullar
His Attorney.

Patented Aug. 21, 1934

1,971,189

UNITED STATES PATENT OFFICE

1,971,189

MAGNETIC DETECTOR

Joseph K. Leibing, Scotia, N. Y., assignor to General Electric Company, a corporation of New York Application February 1, 1933, Serial No. 654,686

10 Claims. (Cl. 175—183)

My invention relates to magnetic indicating devices and concerns particularly such devices for use with systems for locating concealed objects.

One of the systems known for locating concealed objects such as ducts for conductors or junction boxes embedded in concrete under the floors of buildings, for example, is to embed a magnetized pin adjacent each of the objects which it may be desired subsequently to locate. In the case of objects concealed under a horizontal surface such as the floor of a building, the magnetized pin is preferably placed with its axis vertical. The pin may then be located by moving about a dipping compass or a magnetized needle pivoted about a horizontal axis until the compass needle assumes a vertical position, indicating that the magnetic lines of force where the compass needle is located are vertical and that the compass needle is approximately directly above or below the concealed magnetized pin. However, near the vertical axis of the concealed magnet the horizontal component of the magnetic field is quite small in comparison with the vertical component. Consequently, the lines of force are substantially vertical for an appreciable distance either side of the exact magnetic axis of the magnetized pin so that the position of the concealed object cannot be located very exactly and it is necessary to remove and deface an unnecessarily large portion of the flooring and the floor covering or other material concealing the object to be located.

It is an object of my invention to provide a simple, reliable, relatively inexpensive device for locating relatively accurately the positions of concealed objects. Other and further objects will become apparent as the description proceeds.

In carrying out my invention in one form thereof, I provide a casing, preferably in the form of a disk, carrying a plurality of pivoted magnetized needles arranged around a common center. When the common center is directly above the vertically placed bar magnet, this fact is indicated by the alignment of all the needles toward the common point.

The features of my invention which I believe to be novel and patentable are pointed out in the claims appended hereto. A more complete understanding of my invention itself, however, may be obtained by referring to the following description taken in connection with the accompanying drawing, in which Figs. 1 and 2 are schematic diagrams of one embodiment of my invention illustrating the indications obtained under two different conditions; Fig. 3 is a view showing a section cut by the plane 3—3 of Fig. 2, together with a section of flooring and a concealed bar magnet; Fig. 4 is an elevation partially in section illustrating the use of a marking attachment with my device; Fig. 5 is an illustration in perspective of one embodiment of my invention; and Figs. 6, 7, and 8 are theoretical diagrams explaining the principle of operation.

Referring to the drawing, I have shown for the sake of illustration one of the preferred forms of my invention. A circular casing 11 of non-magnetic material, preferably in the form of a circular plate, carries a plurality of pivoted magnetized needles 12, 13, 14 and 15 in well 16. The needles are preferably placed symmetrically about a common center 17.

In Fig. 3 a portion of the material, for example, the flooring in a building concealing an object to be located is represented at 18, and a magnetized pin 19 is shown embedded in a vertical position at the point which is to be located. The indicating device is shown directly above the magnet 19 with the needles in the position indicated in Fig. 2.

Referring to Fig. 4, the indicator may, if desired, be provided with a marking device 20 having a point 21 coinciding with the common center 17 shown in Figs. 1 and 2. The point is normally maintained in a raised position by means of a suitable spring 22. Preferably index markings 23 shown in Fig. 5 are provided to enable the operator to determine more exactly when the needles are pointed directly toward the common center 17.

It will be understood that in a system for locating concealed objects with which my indicating device is ordinarily used, the magnetized pins 19 are preferably placed at each of the positions which it may subsequently be desired to locate before the concrete or other material concealing the positions or the magnets is poured or laid. In subsequently locating one of these positions by means of my device, the casing 11 is moved along, preferably in close proximity to the flooring 18, until the position of the needles indicates that the common center is directly above the magnet 19, when the center punch 20 is depressed lightly to avoid injuring the pivots by a sharp blow, and the point 21 makes a mark in the flooring 18. Thereupon, the material from which the flooring is composed is chipped out or removed in any desired manner to gain access to the object which is to be exposed.

Although I have shown a system, for the sake of illustration, in which the concealed magnet 19 is placed vertically and the indicating magnets pivot in a horizontal plane, it will be understood that my invention is not limited thereto but obviously includes modifications employing a similar principle, such as for example, the use of a horizontal concealed magnet and indicating magnets pivoted in a vertical plane, where the object to be located is concealed behind a vertical surface such as the wall of a building.

The principle of operation of my device will become apparent from a consideration of the nature of the magnetic field. The direction of the field of force of a magnet at any point is represented by the direction of the imaginary so-called lines of force 24, shown in Fig. 6. It is well known that in the case of a bar magnet these lines of force are substantially parallel to the magnetic axis within the magnet and tend to diverge symmetrically with respect to the axis of the magnet as they leave the poles of the magnet. Consequently, a freely suspended magnetized needle placed approximately above a vertical bar magnet will assume a nearly vertical position. However, since the field has a small horizontal component, a magnetized needle which is free to deflect only in a horizontal plane will tend to align itself in a direction of the horizontal component of the field of force of the bar magnet. At the point P, for example, the magnetic field H may be resolved into two components, the vertical component Z, and the horizontal component X. Although the direction of the field H may change relatively little in passing from point P to point P', a device responding to horizontal components of magnetic field only will provide an accurate indication of the change in position from P to P' since the direction of the horizontal component X reverses. By employing a plurality of horizontal needles supported by a portable casing, a position may readily be found at which the needles are spaced around the axis 25—25 of magnet 19, and all the needles point toward a common center.

Owing to the fact that the strength of the magnetic field of the concealed vertical magnet 19 decreases as the distance from the magnet 19 increases, but the ratio of the horizontal component to the total field increases with the horizontal distance, there is a particular position in any given direction from the axis of the concealed magnet 19 at which the horizontal component of the field is greatest. I have found that the points at which the horizontal component of field are greatest lie along a circle having its center in the axis of the concealed magnet 19 and having a radius sub-tending an angle of approximately thirty-five degrees at the upper pole of the concealed magnet 19. In any given installation the exact radius of the circle will obviously depend upon the depth of the magnet below the floor, the distance between the poles of the magnet 19 and the degree of concentration of their magnetic poles. Preferably, the magnetized needles 12 to 15 are placed with their pivots on a circle having this radius.

The relationship between the strength of the horizontal component of field and the location of the point at which the strength is measured may best be understood by considering a theoretical concentrated pole $m$ (Fig. 7) located a distance $e$ below the horizontal plane in which the compass needles 12—15 are placed. The field strength H at a point P is proportional to $m/r^2$ where $m$ is the strength of the pole and $r$ is the radial distance between P and $m$. If $\theta$ represents the angle between vertical and the line joining P and $m$, and K a constant of proportionality, the horizontal component of H is $$X = KH \sin \theta = \frac{Km \sin \theta}{r^2} = \frac{Km \sin \theta \cos^2 \theta}{e^2}$$

Since the height $e$ is constant for any given plane, the only variable factor is $\sin \theta \cos^2 \theta$ which has a maximum value, as shown in the curve of Fig. 8, at a value of $\theta$ between 30° and 40°. From Fig. 8 it will be seen that by placing the compass needles 12 to 15 in the circle of maximum horizontal component of field a very materially greater force is available for overcoming pivot friction. For example, at the maximum point this force is 600% greater than the force which would be available at a displacement of $\theta$—5° which might be assumed for the dip needle indication.

Since a magnetized needle suspended for rotation in a vertical plane, or a dipping needle is bound to be subject to a certain amount of sticking or friction at the pivots, an appreciable horizontal component is required to deflect the needle from vertical when it is moved away from above the concealed magnets. Then since the horizontal component of the field is smallest in the vicinity of the axis of the magnet 19 and drops to zero directly over it, a dipping needle is in the worst position from the point of view of field strength and becomes relatively inaccurate in just the area where greatest accuracy is required. In my device, however, the magnetized needles 12 to 15 may be arranged so as to be in the best position, at which the horizontal components are greatest, when the device is placed with the center 17 above the concealed magnet 19. This permits locating the concealed magnet precisely.

In Fig. 1, the positions of the needles are shown when the casing 11 is some distance to one side of the magnetic axis 25—25 of the bar magnet 19 so that the ends of a given polarity, here distinguished by shading, of all the needles point toward the bar magnet and are substantially parallel. Fig. 2, however, represents the position of the needles with the common center 17 in the magnetic axis 25—25 of the bar magnet 19. Since the needles 12, 13, 14, and 15 are then arranged symmetrically both around the common center 17, device 11, and around the magnetic axis 25—25 of the bar magnet 19, the horizontal component of the magnetic field affecting each of the needles is toward the common center 17, and the shaded ends of the needles point toward 17. With the casing 11 in any other position, the needles would point toward the magnetic axis of the bar magnet 19 instead of toward the common center 17, thereby indicating that the device must be moved in one direction or another to locate accurately the concealed point. The direction in which the device is to be moved is indicated by the direction in which the needles are pointing. In Fig. 1, for example, the position of the needles shows that the device must be moved in the direction of the shaded ends of the needles until the shaded ends of all the needles are drawn around to point to the common center 17.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A magnetic indicating device comprising a plurality of freely pivoted magnetic members, means for supporting said members on different axes around a common point, means for indicating when each of said members is aligned toward said point, thereby indicating that said point lies on the magnetic axis of a device for producing a magnetic field.

2. A magnetic indicating device comprising more than two freely pivoted substantially coplanar magnetic members, means for supporting said members on different axes about a common point in the plane of said members, whereby each of said members becomes aligned toward said point when said members are placed with said point lying on a magnetic line of force perpendicular to said plane.

3. A magnetic indicating device comprising a portable plate, a plurality of magnetic needles pivotally supported thereon on different axes about a given point on said plate, means for indicating when all of said needles are directed toward said point, thereby indicating that said point lies on a magnetic line of force perpendicular to said plate.

4. A magnetic indicating and marking device comprising a portable plate, a plurality of magnetized needles pivotally supported on different axes by said plate around a point thereon, whereby each of said needles becomes directed toward said point when said plate is placed with said point lying on a magnetic line of force perpendicular to said plate, and means for making a mark below said point on an object adjacent said plate.

5. An arrangement for locating a concealed position which comprises in combination a bar magnet permanently supported at said position, a plurality of freely pivoted magnetic members, portable means for supporting said members on different axes around a common point in said means, and means for indicating when each of said members is aligned toward said point, thereby indicating that said point lies on the magnetic axis of said bar magnet.

6. A magnetic indicating device comprising a portable non-magnetic casing, and more than two pivoted magnetic needles supported by said casing and arranged symmetrically about a common center, whereby said needles become aligned toward said common center when said casing is placed with said center on the axis of a magnetic field of force.

7. A magnetic indicating device comprising a non-magnetic casing, a plurality of pivoted magnetic needles supported by said casing and arranged symmetrically about a common center, index markings to indicate coincidence of the needles with their respective radial directions from the common center, and means for effecting a marking upon adjacent materials to record the position occupied by said common center when magnetic symmetry is attained.

8. A magnetic indicating device comprising a portable non-magnetic plate, a plurality of pivoted magnetic needles supported by said plate and arranged symmetrically about a common center, and means for determining when each of said needles is aligned toward said common center to indicate that said center lies on a magnetic field of force perpendicular to said plate.

9. A magnetic indicating device comprising a non-magnetic plate, four pivoted magnetic needles supported by said plate and arranged symmetrically about a common center, and index markings to indicate when said needles are aligned toward said common center to indicate that said center lies on a magnetic field of force perpendicular to said plate.

10. A magnetic indicating device comprising a non-magnetic plate, a plurality of pivoted magnetic needles supported by said plate and arranged symmetrically about a common center, whereby said needles become aligned toward said common center when said plate is placed with said center on a magnetic field of force perpendicular to said plate, and means for effecting a marking upon adjacent materials to record the position occupied by said common center when magnetic symmetry is attained.

JOSEPH K. LEIBING.